Nov. 2, 1965    T. M. McCARTY    3,215,447
ADJUSTABLE CART OR CARRIAGE
Filed July 18, 1963    3 Sheets-Sheet 1

INVENTOR.
Theodore M. McCarty
BY
Otis A. Earl
ATTORNEY

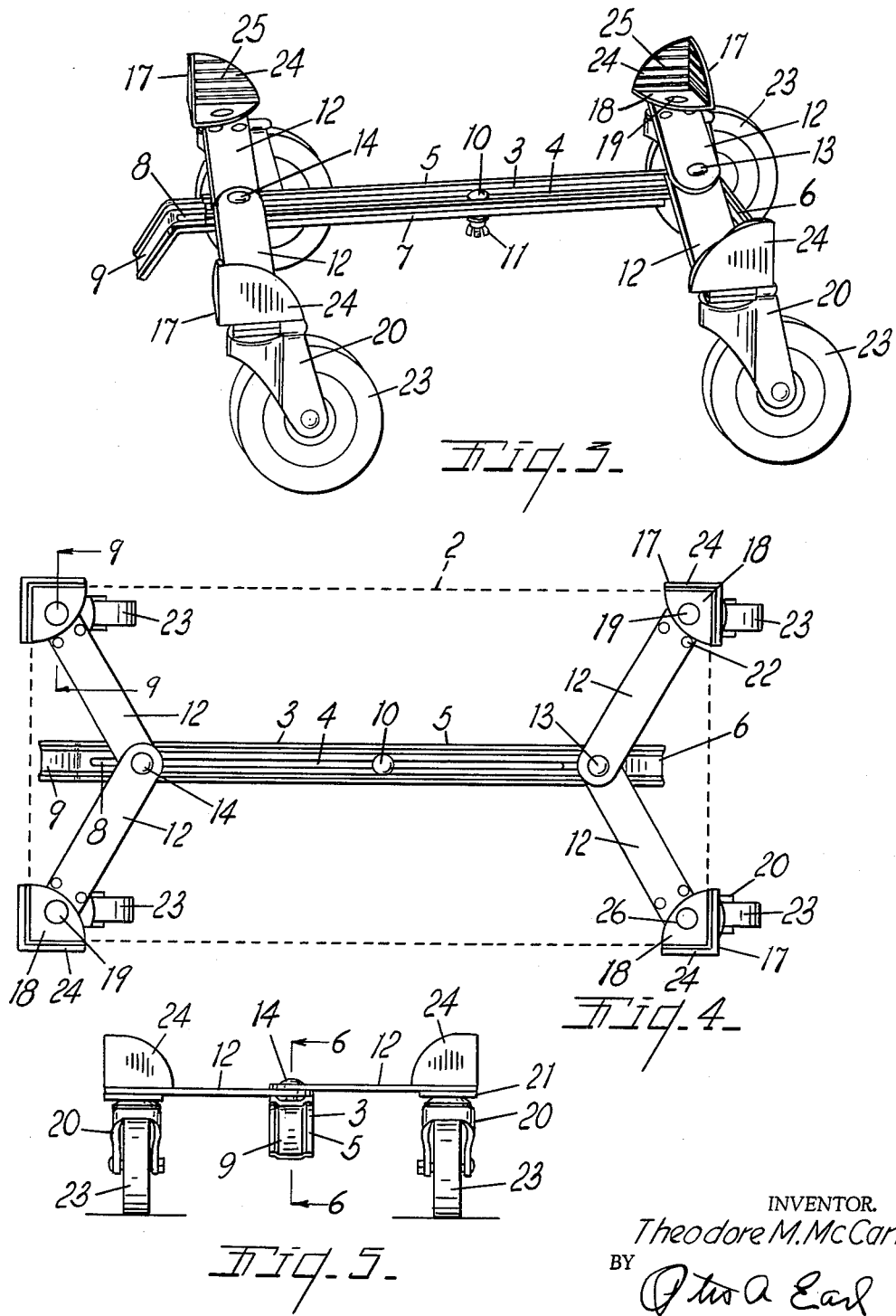

Nov. 2, 1965  T. M. McCARTY  3,215,447
ADJUSTABLE CART OR CARRIAGE
Filed July 18, 1963  3 Sheets-Sheet 3
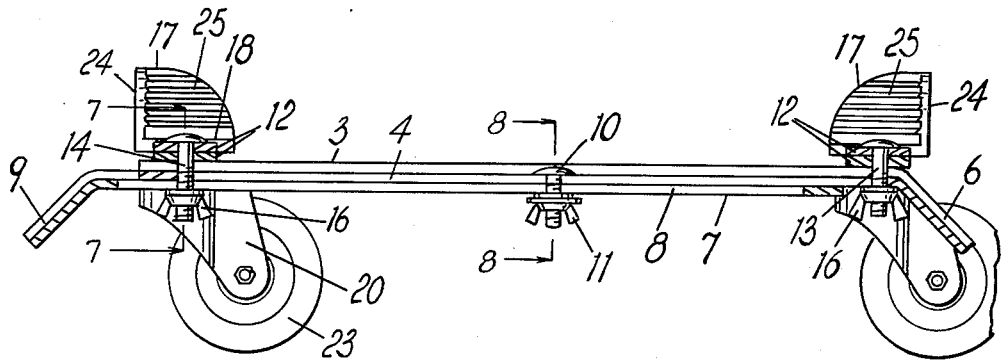
Fig. 6.
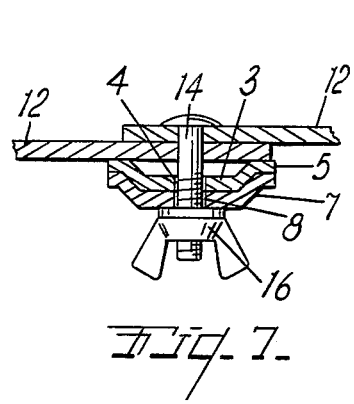
Fig. 7.
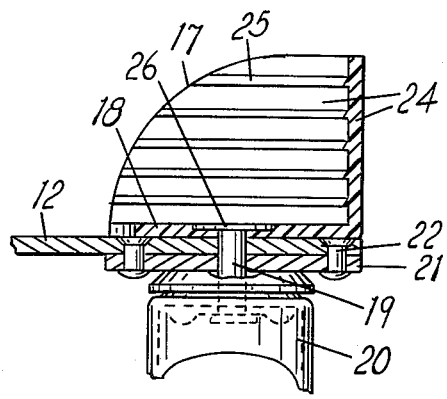
Fig. 9.
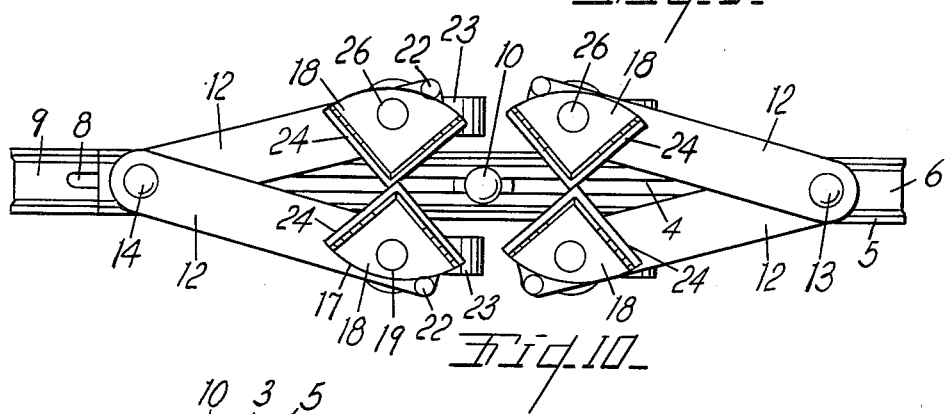
Fig. 10.
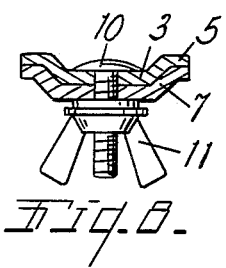
Fig. 8.
INVENTOR.
Theodore M. McCarty
BY
ATTORNEY.

United States Patent Office 3,215,447
Patented Nov. 2, 1965

3,215,447
ADJUSTABLE CART OR CARRIAGE
Theodore M. McCarty, Kalamazoo, Mich., assignor to Gibson, Inc., Kalamazoo, Mich.
Filed July 18, 1963, Ser. No. 296,073
8 Claims. (Cl. 280—35)

This invention relates to a cart or carriage adjustable to receive objects of varying sizes for supporting and translating. The main objects of this invention are:

First, to provide a cart or carriage which may be adjusted to supportingly receive articles of substantially varying sizes.

Second, to provide a cart or carriage which may be adjusted to clampingly engage the objects supported thereon and permit tilting of the assembled unit for convenience in translating.

Third, to provide an adjustable cart or carriage adapted to supportingly receive articles of various widths and lengths.

Fourth, to provide a cart or carriage having these several advantages in which the load is substantially directly supported by the wheels.

Fifth, to provide a structure having these advantages which has relatively few parts and the parts are simple and economical to produce and assemble.

Objects relating to details and economies of the invention will appear from the description to follow. The invention is defined and pointed out in the claims. A preferred embodiment of the invention is illustrated in the accompanying drawing, in which:

FIG. 3 is a perspective view of the cart or carriage embodying my invention with the supporting arms disposed in right angular relation to the reach.

FIG. 4 is a plan view of the structure adjusted to receive an object, to be conveyed, of a different shape from that of the adjustment of FIG. 3, the supported article being indicated by dotted lines.

FIG. 5 is an end view.

FIG. 6 is a longitudinal section on a line corresponding to line 6—6 of FIGS. 4 and 5, the coupling bolts being shown in full lines.

FIG. 7 is an enlarged fragmentary view mainly in section on a line corresponding to line 7—7 of FIG. 6.

FIG. 8 is an enlarged fragmentary view on a line corresponding to line 8—8 of FIG. 6.

FIG. 9 is an enlarged fragmentary view on a line corresponding to line 9—9 of FIG. 4.

FIG. 10 is a plan view of the cart or carriage in a desirably collapsed position for packaging or storing.

In considering the embodiment of my invention illustrated it should be understood that the structure illustrated is designed primarily for the supporting of cabinets or the like, such for example as musical instruments, amplifiers and similar articles which it is desired to support for translation, but that the structure is also adapted for translating various kinds of objects of various sizes and weights.

Figure 1:
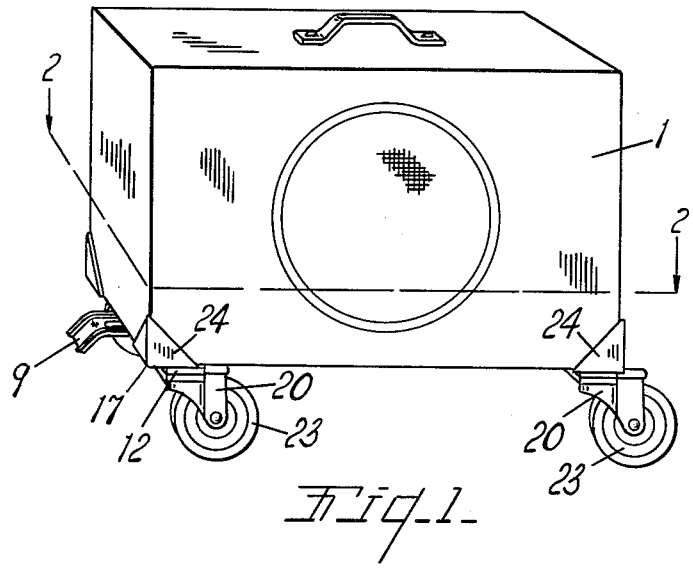
FIG. 1 is a perspective view of the cart or carriage embodying my invention with a musical instrument cabinet conventionally illustrated thereon.
Figure 2:
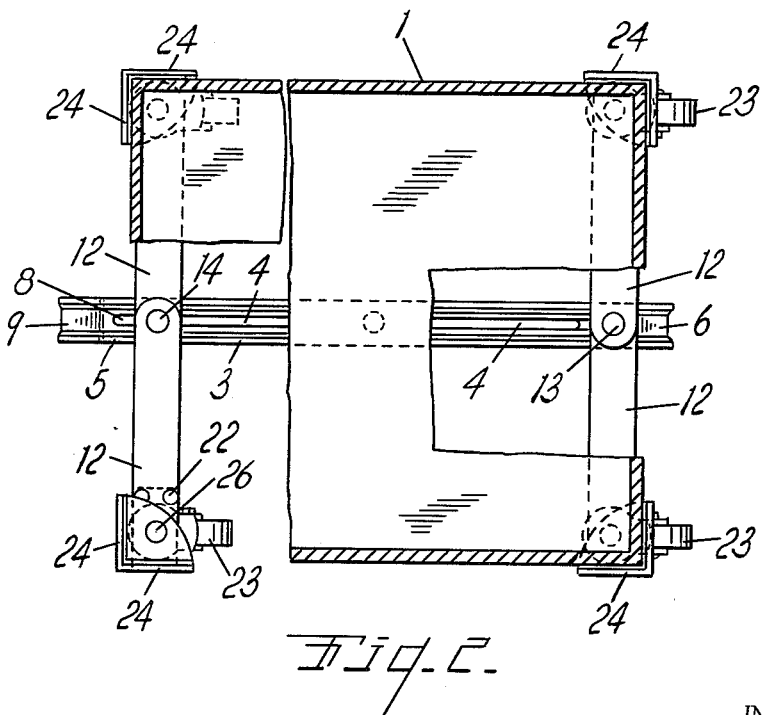
FIG. 2 is a fragmentary horizontal section on a line corresponding to line 2—2 of FIG. 1.

The structure illustrated in the accompanying drawings is a commercial embodiment of my invention and is primarily designed for the handling of musical instruments. It should also be understood that no attempt has been made in the accompanying drawings to illustrate the very wide range of possible adjustment, only two adjustable positions being illustrated, one—transporting position—being shown in FIGS. 1, 2 and 3, and another in FIG. 4.

In the accompanying drawing, a cabinet 1 is conventionally illustrated but, as stated, the embodiments of my invention are adapted for adjustment to supportingly receive cabinets of varying sizes and shapes, the structure of one shape being indicated by dotted lines 2 in FIG. 4.

The main reach member 3 is of upwardly facing channel section and has a longitudinal slot 4 terminating in a spaced relation to the ends thereof. The flange portions 5 of this structure project upwardly and outwardly as most clearly shown in FIGS. 7 and 8. This main reach member is provided with a downwardly projecting handpiece 6 at one end thereof. The auxiliary reach member 7 is of the same cross sectional shape as the main reach member and is disposed on the underside thereof in supporting relation thereto. It has a longitudinal slot 8 aligned with the slot 4 of the main reach member and it has a downwardly projecting handpiece 9 at the opposite end of the handle piece portion 6 of the carriage. These handle portions are merely downwardly bent portions of the parts to which they are connected but owing to the cross sectional shape of these main and auxiliary reach members, I do provide handle portions which may be conveniently grasped.

The bolt 10 disposed through the slots of the main and auxiliary reach members intermediate their ends is provided with a clamping nut 11 of the wing type which facilitates adjustment to clampingly secure these main and auxiliary reach members in their adjusted position.

Pairs of supporting arms 12 are provided, these being—in the embodiment illustrated—of flat stock. Their inner ends are arranged in overlapping relation to each other and in overlapping relation at one end to the main reach member to which they are pivotally and adjustably secured by the bolts 13 and 14 arranged through the longitudinal slot of the main reach member, the bolt 14 also being arranged through the longitudinal slot of the auxiliary reach member, see FIGS. 6 and 7.

It will also be noted that the inner end of the auxiliary reach member 8 terminates inwardly of the bolt 13, see FIG. 6. With this arrangement of parts, the arms 12 may be adjusted longitudinally of the main reach member and may be swung or adjusted to widely varying positions—only two of which are illustrated—and clamped in their adjusted positions by means of the thumb nuts 16. Each arm is provided with article holder members 17 which include base portions 18 supportedly mounted on the outer ends of the arms as is clearly shown in FIG. 9 and rotatably secured thereto by the pivot members 19 which also serve to pivotally connect the caster wheel yokes 20 to the outer ends of the arms, reinforcing plates 21 being secured to the undersides of the arms at their outer ends by means of the rivets 22, the upper ends of which are countersunk into the arms 12 so that they do not interfere with the pivotal movement of the holder members 18 on the outer ends of the arms. The caster wheels 23 are desirably of the rubber tired type.

The holder members have angularly disposed upwardly projecting side walls 24 desirably disposed at right angles to each other to receive the corners of the article to be transported and in commercial practice the holder members are formed of molded thermoplastic material and are provided with inwardly projecting ribs 25 to provide effective gripping engagement with the supported article. It will be noted that the head 26 of the coupling member 19 is recessed in the bottom of these holder members.

With this arrangement of parts an article supportedly positioned in the holder members, which may be adjusted so that they substantially clampingly engage the supported article, may be pushed around by thrust on the supported article or it may be translated by grasping one of the handpieces 6 or 9 and tilting the assembly on one pair of the caster wheels for convenient translation.

As stated, only two positions of adjustment are illustrated but it will be appreciated that a very wide range of adjustment can be made with the supporting arms longitudinally relative to the reach or in tilting relation thereto and when the article is positioned upon the holder members, the arms are secured to the reach against swinging movement.

I have not attempted to illustrate the very wide range of adjustment which is possible to supportingly receive and support objects of varying shapes and sizes and it should be noted that one arm of a pair may be adjusted independently of the other arm of the pair to further adapt the apparatus to receive structures of varying shapes.

The holder members grippingly engage articles which have rounded portions dimensioned of course to be received between the inner edges of the holder flanges and the article holders, and it is also pointed out that the holder members may be of varying sizes and of cross sectional shapes.

In the embodiment illustrated the holder members may be collapsed as is indicated in FIG. 10 so that the structure is very compact for shipment or storage.

I have illustrated and described my invention in a highly desirable commercial embodiment thereof. I have not attempted to illustrate various modifications and adaptations which might be desirable for transporting particular types of material as I believe this disclosure will enable those skilled in the art to embody or adapt my invention as may be desired.

As stated, this commercial embodiment illustrated is especially designed for transporting musical devices which I have illustrated and described.

Having thus described the invention, what is claimed as new and desired to secure by Letters Patent is:

1. In a structure of the class described, the combination of a main reach member of upwardly facing channel section having a longitudinal slot in its web portion disposed centrally thereof and terminating adjacent but in inwardly spaced relation to its ends, flange portions of said reach member being in outwardly diverging inwardly inclined relation to the web portion thereof, an auxiliary reach member disposed on the underside of said main reach member and cross sectionally conformed to slidably fit the underside thereof and having a longitudinal slot aligned with the slot in said main reach member, a bolt disposed through said slots of said main and auxiliary reach members for clampingly securing them in adjusted positions relative to each other, pairs of substantially straight article supporting arms disposed with their inner ends in overlapping relation to each other and in overlapping relation to said main reach member with the lower arms of the pairs supportedly resting on the main reach member, bolts disposed through said overlapping ends of said arms and through said slot in said main reach member, one of said bolts being also disposed through the slot in said auxiliary reach member so that it coacts with said bolt arranged through said main and auxiliary reach members in clampingly securing them in adjusted positions, holder members for transported articles disposed above and pivotally mounted on the outer ends of said arms so that they are positioned in a plane above the plane of said reach members, each of said holder members comprising pivot receiving bottom portions and angularly disposed flanges positioned outwardly therefrom and projecting upwardly from the bottom portion, caster wheels disposed below said arms, and pivots for connecting said caster wheels to said arms also constituting pivots for connecting said holder members to said arms.

2. In a structure of the class described, the combination of a main reach member of upwardly facing channel section having a longitudinal slot in its web portion disposed centrally thereof and terminating adjacent but in inwardly spaced relation to its ends, flange portions of said reach member being in outwardly diverging inwardly inclined relation to the web portion thereof, an auxiliary reach member disposed on the underside of said main reach member and cross sectionally conformed to slidably fit the underside thereof and having a longitudinal slot aligned with the slot in said main reach member, a bolt disposed through said slots of said main and auxiliary reach members for clampingly securing them in adjusted positions relative to each other, pairs of substantially straight article supporting arms disposed with their inner ends in overlapping relation to each other and in overlapping relation to said main reach member with the lower arms of the pair supportedly resting on the main reach member, bolts disposed through said overlapping ends of said arms and through said slot in said main reach member, one of said bolts being also disposed through the slot in said auxiliary reach member so that it coacts with said bolt arranged through said main and auxiliary reach members in clampingly securing them in adjusted positions, holder members for transported articles disposed above and pivotally mounted on the outer ends of said arms, and caster wheels disposed below and pivotally mounted on said arms.

3. In a structure of the class described, the combination of a reach member having a longitudinal slot therein, pairs of article supporting arms disposed with their inner ends in overlapping relation to each other and to said reach member with the inner ends of at least one pair of said arms in overlapping relation to the slotted portion of said reach member, bolts pivotally connecting the overlapping ends of said arms to said reach member, the bolt connecting at least one pair of said arms being engaged in said slot whereby such pair of arms may be adjusted longitudinally of the reach member, and article holder members disposed above and pivotally mounted on the swinging ends of said arms and having upwardly projecting portions supportingly engageable with the article disposed thereon and preventing lateral sliding movement of the article relative to the arms.

4. In a structure of the class described the combination of a main reach member of channel section formed of sheet rock of substantially uniform width and thickness from end to end thereof and having a centrally disposed longitudinal slot therein, an auxiliary reach member of channel section formed of like stock and of substantially the same cross sectional shape disposed with a portion thereof under the first reach member for telescoping adjustment relative thereto and having a longitudinal slot therein registering with the slot of said main reach member, a bolt disposed through said slots and said main and auxiliary reach members for clamping them in their longitudinally adjusted position relative to each other, said bolt being provided with a wing nut disposed on the underside of said reach members, substantially straight article supporting arms disposed in pairs with their inner ends in overlapping relation to each other and in supported overlapping relation to said main reach member, bolts disposed through the overlapping ends of said pairs of arms and through said slot in said main reach member and provided with winged nuts disposed on the undersides of the reach members, one of said bolts being disposed through the slot in said auxiliary reach member for clampingly securing said arms to said reach members and coacting with the first bolt in clampingly securing said reach members in their adjusted position relative to each other, holder members comprising bottom portions disposed above and supportedly and pivotally mounted on the outer ends of said arms and having upwardly projecting angularly disposed article engaging flanges adapted to receive corner portions of a rectangular structure disposed above and supportedly mounted on said arms, and caster wheels disposed below and pivotally mounted on the outer ends of said arms, the pivots for said caster wheels constituting the pivots for said holder members.

5. In a structure of the class described the combination of a main reach member of channel section formed of sheet stock of substantially uniform width and thickness from end to end thereof and having a centrally disposed longitudinal slot therein, an auxiliary reach member of channel section formed of like stock and of substantially the same cross sectional shape disposed with a portion thereof under the first reach member for telescoping adjustment relative thereto and having a longitudinal slot therein registering with the slot of said main reach member, a bolt disposed through said slots and said main and auxiliary reach members for clamping them in their longitudinally adjusted position relative to each other, substantially straight article supporting arms disposed in pairs with their inner ends in overlapping relation to each other and in supported overlapping relation to said main reach member, bolts disposed through the overlapping ends of said pairs of arms and through said slot in said main reach member, one of said bolts being disposed through the slot in said auxiliary reach member for clampingly securing said arms to said reach members and coacting with the first bolt in clampingly securing said reach members in their adjusted position relative to each other, holder members comprising bottom portions disposed above and supportedly and pivotally mounted on the outer ends of said arms and having upwardly projecting angularly disposed article engaging flanges adapted to receive corner portions of a rectangular structure disposed above and supportedly mounted on said arms, and caster wheels disposed below and pivotally mounted on the outer ends of said arms, the pivots for said caster wheels constituting the pivots for said holder members.

6. In a structure of the class described the combination of a main reach member formed of sheet stock of substantially uniform width and thickness from end to end thereof and having a centrally disposed longitudinal slot therein, an auxiliary reach member formed of like stock and of substantially the same cross sectional shape disposed with a portion thereof under the first reach member for telescoping adjustment relative thereto and having a longitudinal slot therein registering with the slot of said main reach member, a bolt disposed through said slots and said main and auxiliary reach members for clamping them in their longitudinally adjusted position relative to each other, substantially straight article supporting arms disposed in pairs with their inner ends in overlapping relation to each other and in supported overlapping relation to said main reach member, bolts disposed through the overlapping ends of said pairs of arms and through said slot in main reach member and provided with winged nuts disposed on the undersides of the reach members, one of said bolts being disposed through the slot in said auxiliary reach member for clampingly securing said arms to said reach members and coacting with the first bolt in clampingly securing said reach members in their adjusted position relative to each other and to said reach members, holder members supportedly and pivotally mounted on the outer ends of said arms and having upwardly projecting article engaging flanges adapted to receive portions of a structure disposed above and supportedly mounted on said arms, and caster wheels disposed below and pivotally mounted on the outer ends of said arms.

7. In a structure of the class described the combination of a main reach member of substantially uniform cross section from end to end thereof and having a longitudinal slot therein, an auxiliary reach member of substantially the same cross section as said main reach member disposed with a substantial portion thereof in lapping slidable relation to said main reach member and having a longitudinal slot therein registering with the said slot of said main reach member, a bolt disposed through the slots of said main and auxiliary reach members for clamping them in their longtudinally adjusted positions relative to each other, substantially straight article supporting arms disposed in pairs to project oppositely from said reach members with their inner ends in overlapping relation to each other and in supported overlapping relation to said main reach member, clamping bolts disposed through the overlapping ends of said pairs of arms and through said slot in said main reach member, one of the bolts being disposed through the slots in said main and auxiliary reach members for clampingly securing the arms in their adjusted position relative to said reach members and co-acting with said first bolt in securing the reach members in their adjusted positions relative to each other, holder members comprising article supporting bottom portions pivotally mounted on the outer ends of said arms and having upwardly projecting article engaging flanges, said holder members and article engaging portions being in a plane above the plane of said reach members.

8. In a structure of the class described the combination of a main reach member of substantially uniform cross section from end to end thereof and having a longitudinal slot therein, an auxiliary reach member of substantially the same cross section as said main reach member disposed with a substantial portion thereof in lapping slidable relation to said first main reach member and having a longitudinal slot therein registering with the said slot of said main reach member, a bolt disposed through the slots of said main and auxiliary reach members for clamping them in their longitudinally adjusted positions relative to each other, substantally straight article supporting arms disposed in pairs to project oppositely from said reach members with their inner ends in overlapping relation to each other and in supported overlapping relation to said main reach member, clamping bolts disposed through the overlapping ends of said pairs of arms and through said slot in said main reach member, one of the bolts being disposed through the slots in said main and auxiliary reach members for clampingly securing the arms in their adjusted position relative to said reach members and coacting with said first bolt in clampingly securing the reach members in their adjusted positions relative to each other, and article supporting and holder members pivotally mounted on the outer ends of said arms and having article engaging portions disposed in a plane above the plane of said reach members, substantial portions of said arms and holder members being collapsible over said reach members.

References Cited by the Examiner
UNITED STATES PATENTS

| | | | |
|---|---|---|---|
| 198,523 | 12/77 | Slemons | 280—35 |
| 241,809 | 4/32 | Long | 280—35 |
| 1,853,318 | 4/32 | Peters | 280—35 |
| 2,639,162 | 5/53 | Schon | 280—42 |

ARTHUR L. LA POINT, *Primary Examiner.*

UNITED STATES PATENT OFFICE
CERTIFICATE OF CORRECTION

Patent No. 3,215,447 November 2, 1965

Theodore M. McCarty

It is hereby certified that error appears in the above numbered patent requiring correction and that the said Letters Patent should read as corrected below.

Column 4, line 13, for "pair" read -- pairs --; line 42, for "rock" read -- stock --; column 5, line 51, after "in" insert -- said --.

Signed and sealed this 25th day of October 1966.

(SEAL)
Attest:

ERNEST W. SWIDER
Attesting Officer

EDWARD J. BRENNER
Commissioner of Patents